(No Model.)
G. STRONER.
METAL TURNING TOOL.
No. 450,733. Patented Apr. 21, 1891.
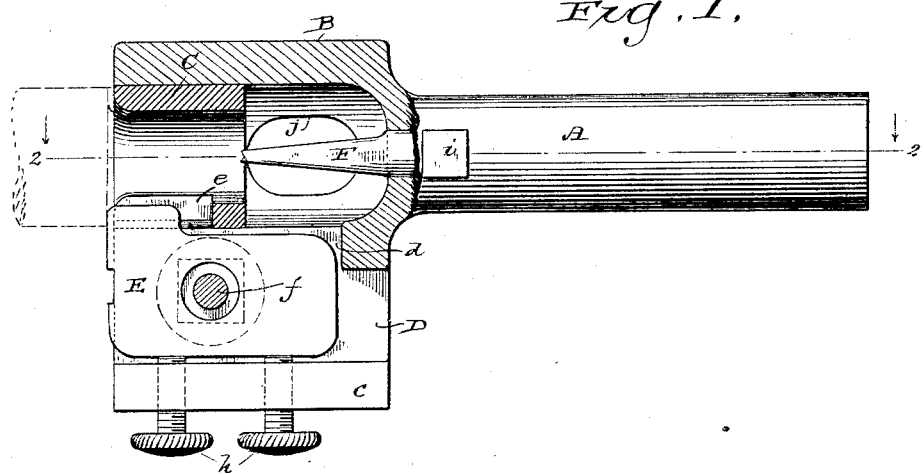
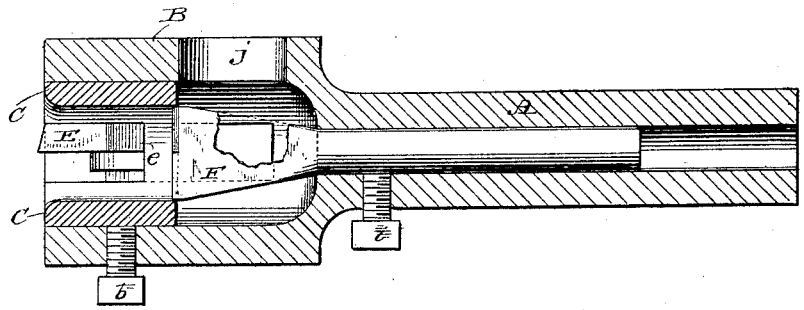
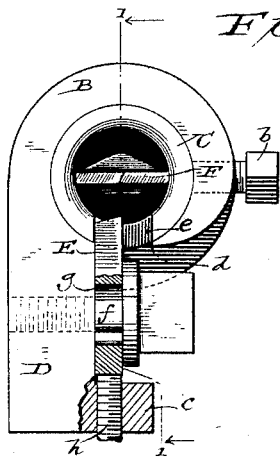
Witnesses
Geo. W. Young
Wm. U. Light
Inventor
George Stroner
By H. G. Underwood
Attorney
THE NORRIS PETERS CO., PHOTO-LITHO., WASHINGTON, D. C.

UNITED STATES PATENT OFFICE.

GEORGE STRONER, OF BRAINERD, MINNESOTA, ASSIGNOR OF ONE-HALF TO EDWIN D. BANGS AND HAROLD G. UNDERWOOD, BOTH OF MILWAUKEE, WISCONSIN.

METAL-TURNING TOOL.

SPECIFICATION forming part of Letters Patent No. 450,733, dated April 21, 1891.

Application filed November 24, 1890. Serial No. 372,414. (No model.)

*To all whom it may concern:*

Be it known that I, GEORGE STRONER, of Brainerd, in the county of Crow Wing, and in the State of Minnesota, have invented certain new and useful Improvements in Metal-Turning Tools; and I do hereby declare that the following is a full, clear, and exact description thereof.

My invention relates to metal-turning tools; and it consists in certain peculiarities of construction and combination of parts, to be hereinafter described with reference to the accompanying drawings, and subsequently claimed.

In the drawings, Figure 1 represents a plan view of my device, partly in horizontal section on line 1 1 of Fig. 3; Fig. 2, a longitudinal vertical section on line 2 2 of Fig. 1; and Fig. 3, a front end view of said device, partly broken away and partly in section.

Referring by letter to the drawings, A represents a shank designed for attachment to the turret-head of a lathe. In one piece with the shank is a shell B, that receives a slotted thimble C, detachably held in place by means of a set-screw $b$, and laterally extended from the shell is a base D, having a flange $c$ at its outer edge, this flange being parallel to a longitudinal opening $d$ cut in said shell to register with the slot $e$ in said thimble.

Retained on the base D by means of a set-screw $f$ is a cutter E, the screw-opening $g$ in this cutter being of such contour and area as to permit of the same being adjusted either laterally, longitudinally, or axially, and set-screws $h$ are arranged in the flange $c$ of the base D to impinge against said cutter, and thereby adjust the latter to the desired position.

Retained in the bore of the shank A by means of a set-screw $i$ is the stem of a tool F, designed for facing the end of the work inserted in the thimble C, above described. The thimble C and cutter E are shaped to correspond to the work to be performed, and the cuttings find their escape through the opening $d$ in the shell B, the latter being also provided with another opening $j$ for the escape of the cuttings by the facing-tool F, above described. The thimble and cutter being relative as regards the work to be performed, they are made detachable, so as to be substituted by others of different designs, as occasion may require, the ones shown in the drawings being adapted for turning down an end of a rod or shaft.

By means of the construction and arrangement of parts above described I do away with the necessity of using calipers, and at the same time the work is more accurately and rapidly completed.

Having thus described my invention, what I claim as new, and desire to secure by Letters Patent, is—

1. A metal-turning tool consisting of a shank terminated at one end in a shell, the latter being provided with a longitudinal opening, a slotted thimble detachably arranged in the shell, a base extended laterally from said shell, and an adjustable cutter detachably connected to the base in register with the shell-opening, substantially as set forth.

2. A metal-turning tool consisting of a shank terminated at one end in a shell, the latter being provided with longitudinal openings, a slotted thimble detachably arranged in the shell, a base extended laterally from said shell, an adjustable cutter detachably connected to the base in register with the side opening in the aforesaid thimble, and a facing-tool having its stem detachably fitted in said shank, substantially as set forth.

3. A metal-turning tool consisting of a hollow shank terminated at one end in a shell having a longitudinal opening therein, a slotted thimble detachably retained within the shell, the base D, laterally extended from said shell and provided with the flange $c$, an adjustable cutter detachably connected to said base in register with the shell-opening, and set-screws arranged in the base-flange to impinge against the cutter, substantially as set forth.

In testimony that I claim the foregoing I have hereunto set my hand, at Milwaukee, in the county of Milwaukee and State of Wisconsin, in the presence of two witnesses.

GEORGE STRONER.

Witnesses:
N. E. OLIPHANT,
WM. KLUG.